United States Patent [19]
Hunt

[11] Patent Number: 5,558,235
[45] Date of Patent: Sep. 24, 1996

[54] ORGANIZER SUPPORT STRUCTURE FOR AUDIO/VIDEO MEDIA

[75] Inventor: Thomas A. Hunt, Encinitas, Calif.

[73] Assignee: Spectrum Concepts, Inc., Encinitas, Calif.

[21] Appl. No.: 301,068

[22] Filed: Sep. 6, 1994

[51] Int. Cl.⁶ .................................................. A47G 29/00
[52] U.S. Cl. ........................... 211/40; 211/41; 206/387.1; 312/9.47; 312/9.52; 312/9.55; 312/348.3
[58] Field of Search ..................... 211/40, 41; 206/309, 206/387.1; 312/9.9, 9.45, 9.47, 9.52, 9.55, 348.3

[56] References Cited

U.S. PATENT DOCUMENTS

| | | | |
|---|---|---|---|
| 3,897,871 | 8/1975 | Zinnbauer | 211/41 X |
| 3,907,116 | 9/1975 | Wolf et al. | 211/40 |
| 4,117,931 | 10/1978 | Berkman | 211/40 X |
| 4,231,473 | 11/1980 | Aprahamian | 206/387.1 |
| 4,411,481 | 10/1983 | Berkman | 312/9.52 |
| 4,440,458 | 4/1984 | Berkman | 312/348.3 X |
| 4,707,247 | 11/1987 | Savoy | 211/40 |
| 4,741,438 | 5/1988 | Mastronardo | 211/40 X |
| 5,103,986 | 4/1992 | Marlowe | 211/126 X |
| 5,335,795 | 8/1994 | Chizen | 211/41 |
| 5,383,722 | 1/1995 | Chen | 312/348.3 X |

Primary Examiner—Alvin C. Chin-Shue
Assistant Examiner—Brian J. Hamilla
Attorney, Agent, or Firm—Bernard L. Kleinke; Peter P. Scott

[57] ABSTRACT

An audio/video media package storage structure is formed using side rails, partition rails and spacer tubes. The side rail inner surface contains: a bottom flange; a row of interleaved long and short posts; a shelf beneath the posts and above the bottom flange, the shelf having notches centered between adjacent long posts. The rail can support packages of up to three different sizes at one time. Thin packages are supported between adjacent long and short posts and rest on the shelf. Thick packages are supported between adjacent long posts and rest on the bottom flange. Medium-sized packages fit within the notch on the shelf and rest on the bottom flange. The shelf and the bottom flange have protuberances centered between adjacent long and short posts and adjacent posts, respectively, to allow the packages to shift from a forwardly to a rearwardly-oriented display position. Each end of the side rail has a tunnel adjoining the bottom flange for inserting a spacer tube. Two side rails attached to common spacer tubes form a single row of package support clusters. Other variations are possible with use of a partition rail, which is essentially two side rails in back-to-back configuration. Two side rails and an intermediate partition rail attached to spacer tubes form two rows of package support clusters. The side rails may be attached to roller-type slide brackets to mount the structure to cabinetry. The rails are injection molded.

43 Claims, 6 Drawing Sheets

ORGANIZER SUPPORT STRUCTURE FOR AUDIO/VIDEO MEDIA

FIELD OF THE INVENTION

The present invention relates to the field of organized package storage support, and more particularly it relates to a versatile structure for organized near-upright storage and display support of an intermixture of several different sized packages containing audio/video home media such as compact discs, audio tape cassettes and video tape cassettes.

BACKGROUND OF THE INVENTION

The popularity of packaged audio-video media such as CD's (compact discs), audio tape cassettes and videotape cassettes has resulted in new unfilled needs for storage support facilities for such packages both in the home and at point-of-sale marketing locations. In particular there is widespread need for lightweight, easily manufactured, economical structure that can provide intermixed storage and display of several different sized media packages in columns, supported from the base of the package in a nearly upright inclined disposition that is made bistable to facilitate inspection of information on the front or rear of any package by "flipping back" a portion of a column.

DISCUSSION OF RELATED KNOWN ART

A basic bulk storage approach is exemplified by U.S. Pat. No. 5,117,984 to Kennedy, where bookend members are slidably attached by four rods that provide side and bottom constraint, however this approach does not provide individual support cells for each item and thus would tend to become disorderly; also the lateral constraint is restricted to a single width size.

U.S. Pat. No. 4,782,949 to Berkman, U.S. Pat. No. 4,705,169 to Mastronardo, U.S. Pat. No. 3,710,900 to Fink, U.S. Pat. No. 4,960,205 to Wang and U.S. Pat. No. 4,411,481 to Berkman exemplify the common practice of forming individual compartments that constrain each article in a single fixed location by full or partial partitions, and fails to provide the bistable tilted support capability sought in the present invention. Simply making the compartments larger in the thickness dimension fails to provide this capability in a satisfactory manner since there are special difficulties with the bottom shape required to achieve smooth transition in shifting an item between the two bistable support positions. Thus there have been efforts to configure the support cells in special shapes to accomplish satisfactory bistable support, as exemplified by U.S. Pat. No. 5,215,198 to Sutton, U.S. Pat. No. 4,819,813 to Schubert, U.S. Pat. No. 4,629,027 to Pavlik et al and U.S. Pat. No. 4,896,769 to Merzon. These have found it necessary to utilize a solid base structure with support cells formed as specially-shaped identical parallel transverse cavities in the solid base block which is typically flanked by separate side strips. Generally the complex shapes required in this approach have made this type of support structure heavy, costly and hard to produce: typically requiring assembly of several individual parts some of which may have to be machined since the complexity of the cavities precludes any economical molded method of manufacture.

Easily molded one-piece tray configurations are exemplified by U.S. Pat. No. 4,960,205 to Wang and U.S. Pat. No. 4,712,679 to Lowe. This style can be made to support packages by two lower corners rather than across the entire bottom, and in some instances multi size cell support has been provided; however the cited art and other known art of this style, teaching fixed, single-position support structure, have failed to provide a satisfactory solution for bistable tilted multi-size support structure due to geometric limitations imposed by the molding process. Furthermore a one-piece structure lacks the versatility required in the marketplace addressed by the present invention: a different costly molding tool is required for different overall sizes, widths, etc. Versatility of the storage support structure is required for coping with the variety of audio/video media package sizes found presently in the marketplace, and particularly to avoid obsolescence in view of new package sizes being introduced in the marketplace at an increasing rate.

OBJECTS OF THE INVENTION

It is a primary object of the present invention to provide a versatile structural system for assembling columnar-organized storage racks for audio/video media that can accommodate a mixture of up to three different sized packages within a storage column.

It is a further object to provide the capability of assembling racks with single or multiple columns.

It is a further object to provide a rack structure wherein the column widths may be easily preselected or changed.

It is a further object to define a small number of easily manufacturable basic parts from which a large variety of storage racks can be assembled.

SUMMARY OF THE INVENTION

The abovementioned objects have been accomplished in the storage rack system of the present invention wherein organized storage of a mixture of all major present day audio/video home media packaging formats is provided by rigid racks easily assembled from three basic building blocks: side rails with support structure formed on one side, central rails with support structure formed on both sides for forming multiple side-by-side columns, and spacer means removably attached to the rails. The rails are articulated in a repetitive pattern of identical storage support clusters each offering support cells of three sizes to hold rectangular media packages of mixed sizes in a near-upright position, supported at lower corners of the packages. The two styles of rails, side and partition, can be economically injection molded from plastic. The spacer means may be a pair of metal tubes, typically of black anodized aluminum. They are removably attached to a pair of side rails by a snap action and are retained frictionally to form a rigid support frame that can be made to provide any desired column width. Multiple side-by-side support columns can be formed by snapping central rails onto the tubes between a pair of side rails. The side rails may be fitted with roller type slide brackets such as Euro-rails for attachment to cabinetry, or with other innovative roller mechanism. Alternatively, the support frame may be fitted with special end members on the tubes, secured onto a mounting plate such as a wooden cabinet shelf. Many other combinations can be formed for accommodating various media packages, present and future.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
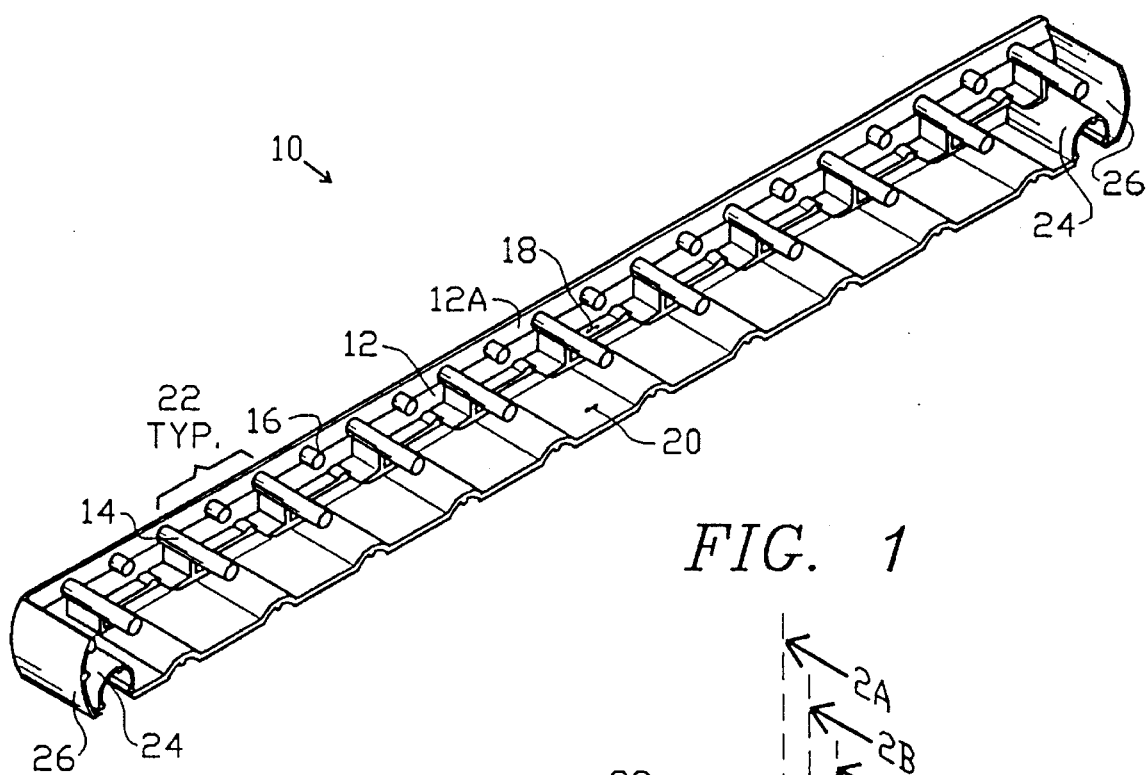
FIG. 1 is an isometric view of a side rail of the present invention.

FIG. 1 is an isometric view of an injection molded plastic side rail 10 which is the main component in a preferred embodiment of the invention. Side rail 10 is symmetrical end-to-end, and is formed basically as an angle bracket with a sidewall 12 having an inner side articulated to form a package support structure pattern to provide the required support at lower corners of rectangular media packages, the wall 12 forming the outer boundary of the media storage area.

Wall 12, having a nominal thickness of 0.125" in its main lower portion, may be stiffened by increased thickness, nominally 0.21", in an upper portion 12A, where a row of eleven long posts 14 are uniformly interleaved with ten short posts 16, all formed integrally. Beneath the posts 14 and 16, a shelf 18 disposed at about half way up the wall 12 extends inwardly. A bottom flange 20, also extends inwardly, typically beyond the end of the long posts 14, and extends longitudinally past the two outer long posts 14 to join a lower edge of tunnels 24 at each end.

Posts 14 and 16, shelf 18 and flange 20 are configured in a repetitive pattern of ten identical storage support clusters as typified by cluster 22.

Figure 1A:
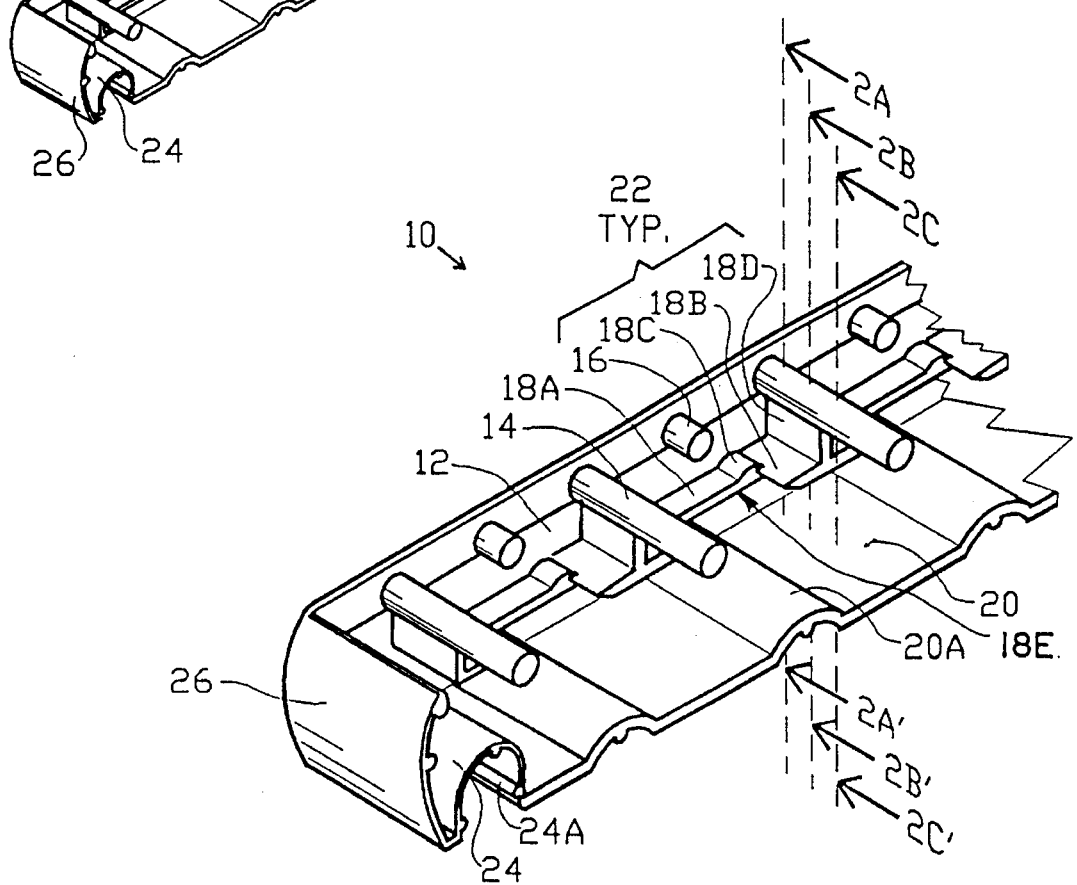
FIG. 1A is an enlarged view of an end portion of the side rail shown in FIG. 1.

FIG. 1A is an enlarged view of an end segment of side rail 10 of FIG. 1, showing the following features of a typical support cluster 22: a short post 16 centered between a pair of long posts 14, a narrow shelf region 18A flanked by full width shelf regions 18B forming a notch 18E defining a support cell, a pair of minor support ribs 18C spanning the narrow shelf region 18A (one is concealed in this view), a web 18D running vertically down from the underside of each long post to shelf at a full width region 18B, and a major support rib 20A formed in bottom flange 20.

A tunnel 24, formed integrally near each end of side rail 10 adjoining the bottom flange 20 and wall 12, is configured with three internal bearing ridges 24A running laterally the full length of its inside surface, spaced radially about 120 degrees apart. An end cap 26, formed at each end of side rail 10, is integrally attached to wall 12 and to a bottom edge of tunnel 24.

Figure 2A:
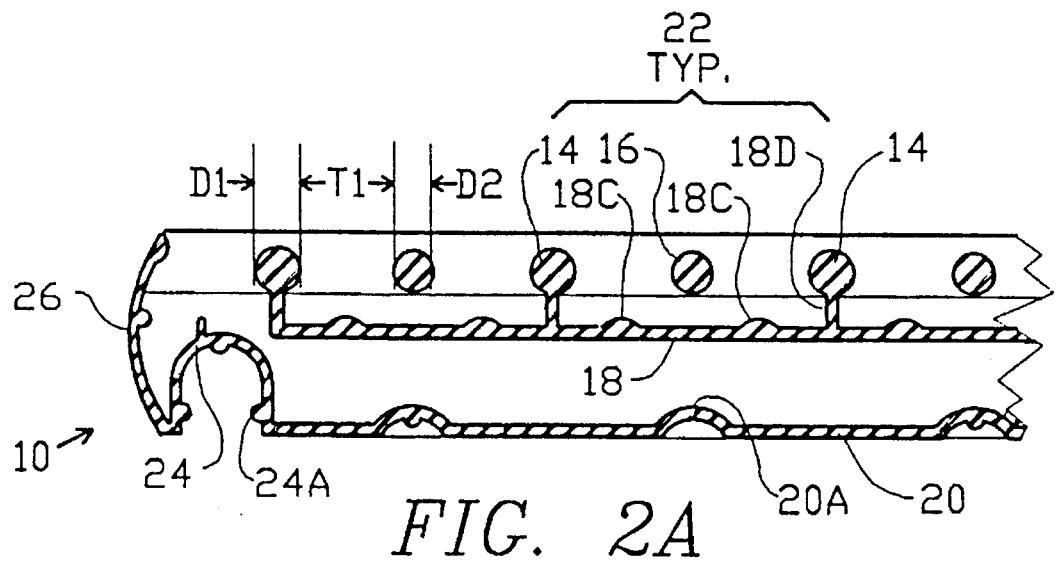
FIGS. 2A, 2B and 2C are cross-sections taken through axes 2A-2A', 2B-2B' and 2C-2C' of FIG. 1A.

FIG. 2A is a cross-sectional view taken through axis 2a-2A' of FIG. 1A showing typical support cluster 22 with a short post 16 centered between a pair of long posts 14, a major support rib 20A beneath short post 16, and the pair of minor support ribs 18C formed on shelf 18 midway beneath posts 14 and 16.

In the preferred embodiment, the long posts 14 are made to have a diameter $D1=0.216"$ and a length $L1=0.75"$, the short posts 16 are made to have a diameter $D2=0.192"$ and a length $L2=0.20"$, all posts are positioned to have a center-to-center spacing $C=0.688"$, thus the opening between posts defines a support cell thickness dimension $T1=C-(D1+D2)/2=0.688"-(0.216+0.192)/2"=0.456"$. The minor support ribs 18C each provide a partial cylindrical surface with a radius of 0.156" and their uppermost surfaces are spaced 0.252" below the center line of posts 14 and 16, the major support ribs 20A are made with a radius of 0.386" and their uppermost surfaces are spaced 0.675" below the center line of posts 14 and 16.

Figure 2B:
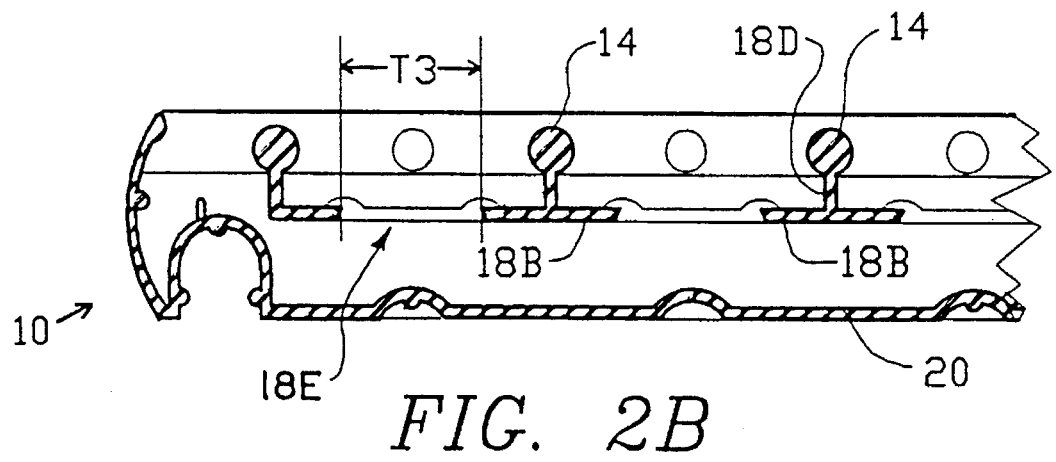

FIG. 2B is a cross-sectional view taken through axis 2B-2B' of FIG. 1A showing that in cell 22, only the long posts 14, wide shelf segments 18B, webs 18D and bottom flange 20 extend inwardly beyond this plane of axis 2B-2B'. In the preferred embodiment, each notch formed between full width segments 18B defines a support cell thickness dimension $T3=0.756"$.

Figure 2C:
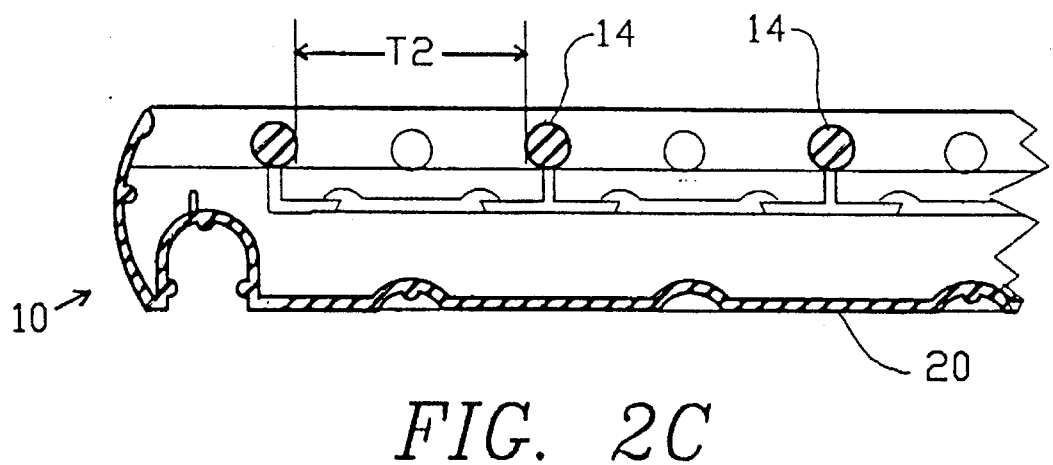

FIG. 2C is a cross-sectional view taken through axis 3C-3C' of FIG. 1A showing that only the long posts 14 and bottom flange 20 extend inwardly beyond this plane of axis 2C-2C'. The space between long posts 14 defines a support cell thickness dimension $T2=2*C-D1=1.376"-0.216"=1.16"$.

Figure 3A:
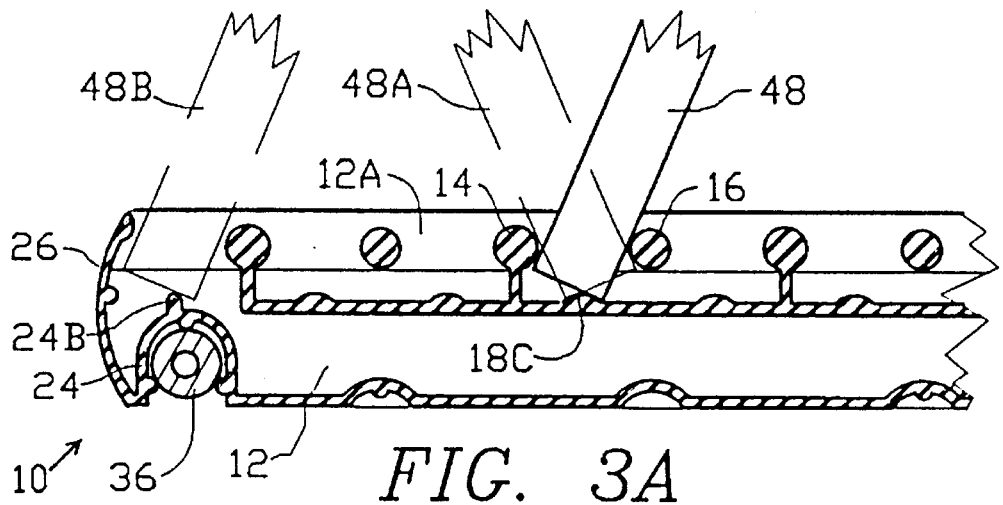
FIGS. 3A, 3B and 3C, similar to FIGS. 2A, 2B and 2C, show the side rail supporting packages of different thickness.

FIG. 3A, similar to FIG. 2A, shows side rail 10 supporting a package 48 of a first thickness, typically a compact disc package that is nominally 0.412" thick, supported at a designated angle of inclination in the 0.456" support cell opening (T1, FIG. 2A) between two adjacent posts: a long post 14 and a short post 16. The bottom of package 48 rests on support rib 18C, which serves as a glide surface to facilitate shifting the package 48 to its alternative stable position shown in dashed outline 48A, inclined at the designated angle in the opposite direction. At each end of the side rail 10, end cap 26 is utilized to provide an extra cell to hold a package 48B shown in dashed outline, resting at the bottom on a support ridge 24B formed on the top of tunnel 24, and inclined at the designated angle. A spacer tube 36 is shown within tunnel 24, gripped by the three ridges 24A.

Figure 3B:
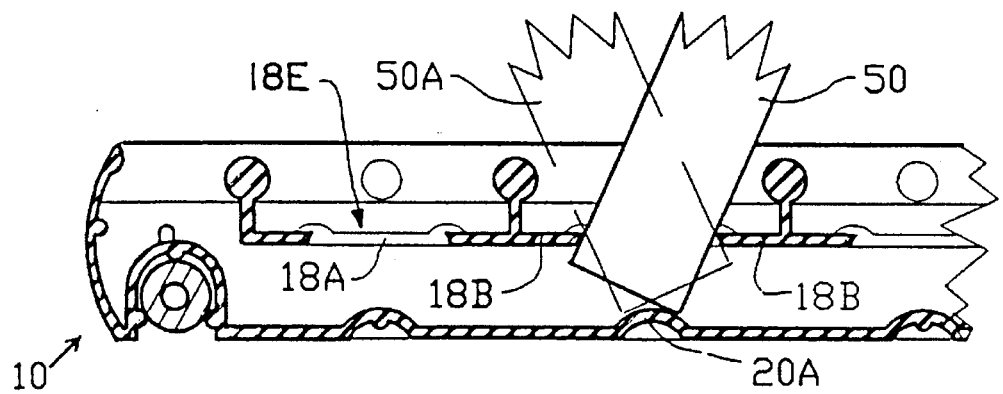

FIG. 3B, similar to FIG. 2B, shows side rail 10 supporting a package 50 of a second thickness, typically an audiotape cassette package that is nominally 0.67" thick, retained in a notch 18E whose 0.756" length (T3, FIG. 2B) defines a support cell thickness dimension that supports the package at the designated 0 inclined angle as shown. Dashed outline 50A shows the alternative supported position of package 50.

Figure 3C:
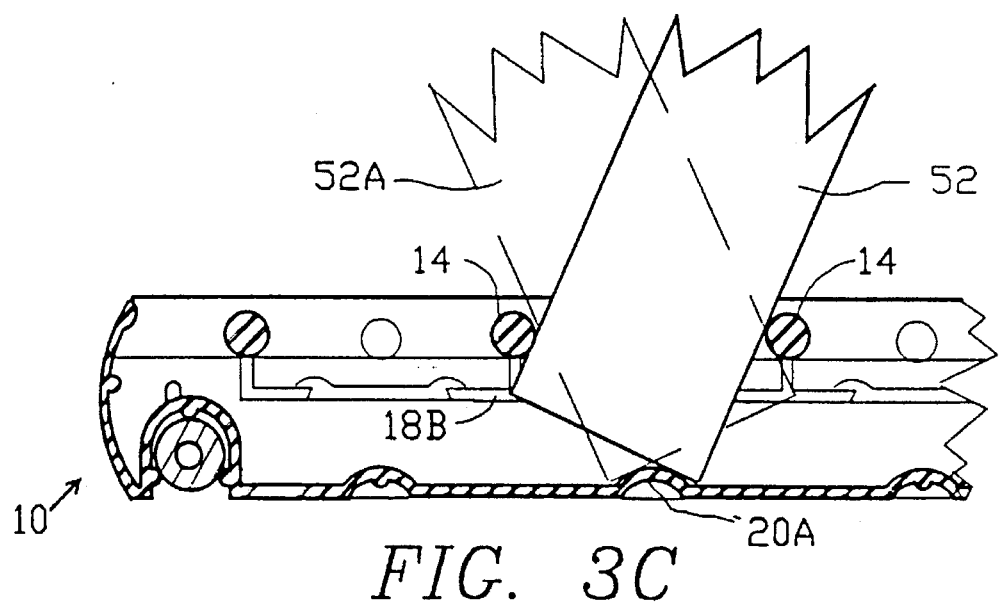

FIG. 3C, similar to FIG. 2C, shows side rail 10 supporting a package 52 of a third thickness, typically a VHS videotape cassette package that is nominally 1.02" thick, retained between adjacent long posts 14 which form a support cell having a thickness dimension 1.16" (T2, FIG. 2C) that supports the VHS package 52 at the designated inclined angle, resting on a major arched surface 20A as shown. Dashed outline 52A shows the alternative supported position of package 52.

Figure 4:
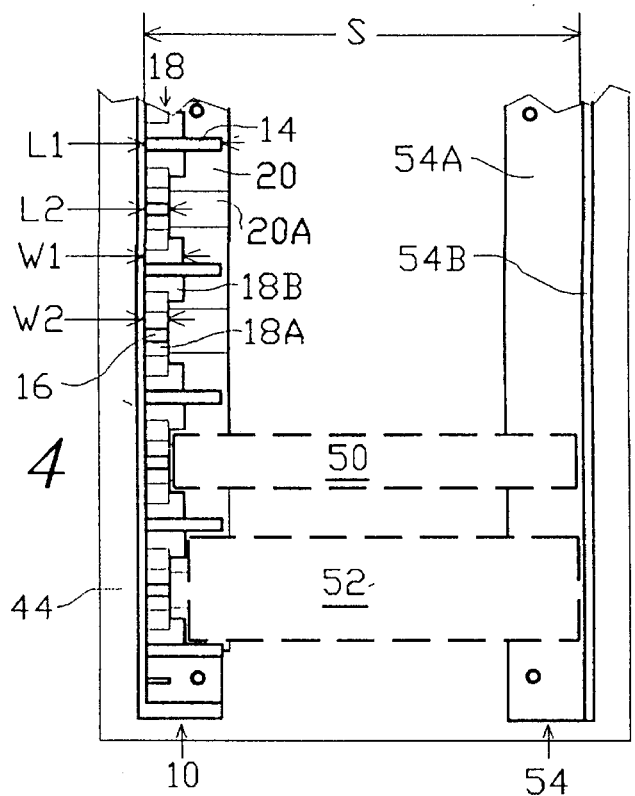
FIG. 4 is a plan view of a portion of a side rail (as in FIG. 1) mounted on a baseplate and cooperating with a simple angle bracket to support a mixture or choice of two different sized packages: an audiotape package and a VHS videotape package.

FIG. 4 is a plan view of side rail 10 acting in combination with a simple angle bracket 54 that provides a horizontal bottom support surface 54A and a vertical surface 54B for lateral constraint of packages. Bracket 54 is located parallel to side rail 10 and both are secured directly or indirectly to the base plate 44 to provide a wall spacing dimension S as indicated. The dashed outlines indicate base regions of two packages of different sizes; they are held in upright disposition, at the designated angle of inclination, by support received at the lower left hand corner region of the package engaged in support cells articulated in side rail 10.

In the preferred embodiment, shelf 18 is made to have a full width W1=0.375" at full width regions 18B and a reduced width W2=0.2" at reduced width regions 18A, referenced to the thick upper portion 12A of wall 12 (FIG. 1).

Audiotape package 50 in landscape (sideways) orientation has a nominal base size 0.67" by 4.29", and is supported in the 0.756" length of the notch 18E in shelf 20 of the side rail 10, receiving lateral constraint from shelf 20 in the notch region where the reduced width W2 is 0.2", thus the minimum wall spacing S required is 4.29"+0.2"=4.49".

VHS videotape package 52 in portrait (upright) orientation has a nominal base size 1.02" by 4.135", and is supported in the 1.16" space between long posts 14, with lateral constraint at the left received from shelf 20 at a region of full shelf width (W1=0.3825"). Thus the minimum required wall spacing S required between the wall of side rail 10 and vertical surface 54 is 4.135"+W1=4.135+0.375=4.51".

Thus the single side rail configuration of FIG. 4, adjusted to make the wall spacing S=4.52", enables intermixed storage of VHS and audiotape packages, providing 0.03" and 0.01" lateral clearance respectively.

Lateral constraint surfaces for the three packages of different thickness are located at three different lateral positions: the wall, the reduced width portion of the shelf 18 at a notch 18E, and the full width portion of the shelf 18, respectively. As an option to providing an angle bracket 54, the lateral constraining vertical surface 54B could be provided by any vertical surface located parallel to the side rail 10, e.g. the side of a drawer, cabinet or other wall surface.

Figure 5:
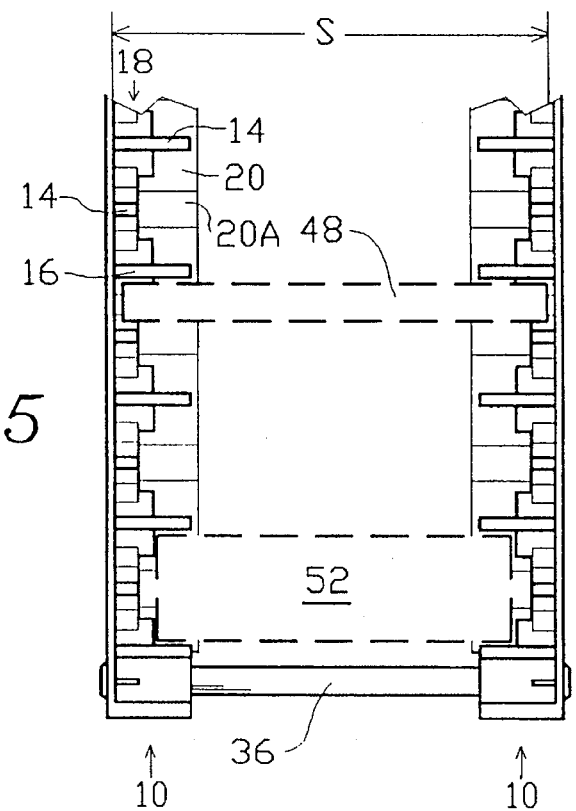
FIG. 5 is a plan view of a portion of a pair of side rails (as in FIG. 1) joined by tubular spacers to form a frame, supporting two different sized packages: a CD (compact disc) package and a VHS videotape package.

FIG. 5 is a plan view of a portion of a pair of side rails 10 assembled into a frame utilizing a pair of metal spacer tubes 36 (one at each end,of which only one is visible in drawing) to provide required wall spacing S.

Package 48 is a CD package in portrait orientation having a nominal base size 0.412" by 4.9" supported in the 0.456" space between adjacent posts 14 and 16 and constrained laterally between the walls of side rails 10, thus requiring a minimum wall spacing S=4.9".

Package 52 is a VHS videotape package in portrait orientation having a nominal base size 1.02" by 4.135", supported in the 1.16" space between long posts 14. Lateral constraint is received from the full width (W1=0.375") of shelf 20 on both sides, thus requiring a minimum wall spacing S=4.135+2*W1=4.135"+2*0.375"=4.135"+0.75"=4.885".

Thus in the dual rail configuration of FIG. 5, making the wall spacing S=4.92" enables intermixed storage of CD and VHS packages, providing 0.02" and 0.035" lateral clearance respectively. Many CD's have a square picture insert that is upright in landscape orientation of the package; this insert can be rotated 90 degrees in the package if desired for storing in portrait orientation. This same spacing dimension (S=4.885"+clearance) can also provide support for audiotape packages in landscape orientation (0.67" by 4.29"), however the support will engage only one corner of the package due to excessive lateral clearance.

Figure 6:
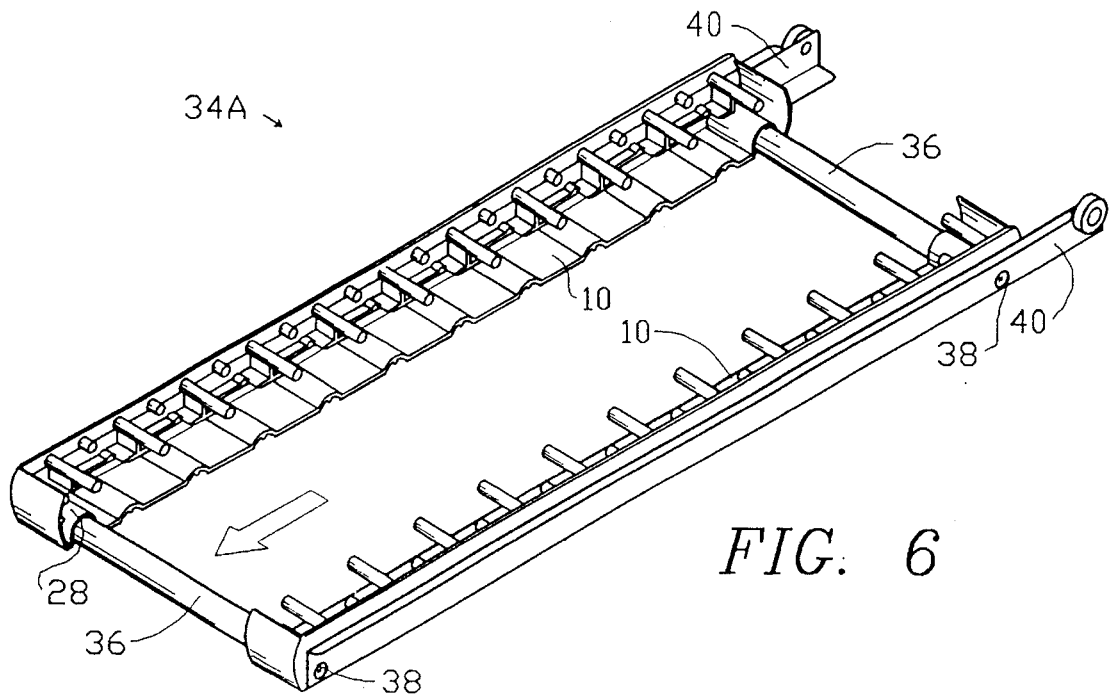
FIG. 6 is an isometric view of a single column storage frame of the present invention assembled from a pair of tubular spacers and a pair of side rails fitted with metal roller slide brackets.

FIG. 6 is an isometric view of a storage frame 34A of the present invention assembled from a pair of spacer tubes 36, typically black anodized aluminum tubing, whose ends are attached by screws 38 to a pair of roller type slide brackets 40 to form a rigid framework to which a pair of side rails 10 are attached via tunnels 24. The actual engagement to tubes 36 is accomplished by bearing ridges 14A (FIG. 1A) which act to provide snap action assembly and firm frictional attachment of the side rails 10 to the tubes 36 in the rigid frame. Thus, the two side rails 10 may be located as shown located against brackets 40; the rails 10 can be easily removed with a moderate twisting action and relocated elsewhere on tubes 36 if desired.

Brackets 40 are available as standard hardware items, e.g. Euro-Slides, supplied with mating slide channels that are typically attached to associated cabinetry so as to enable frame 34A to be slid in and out with roller action in the manner of a drawer.

Figure 7:
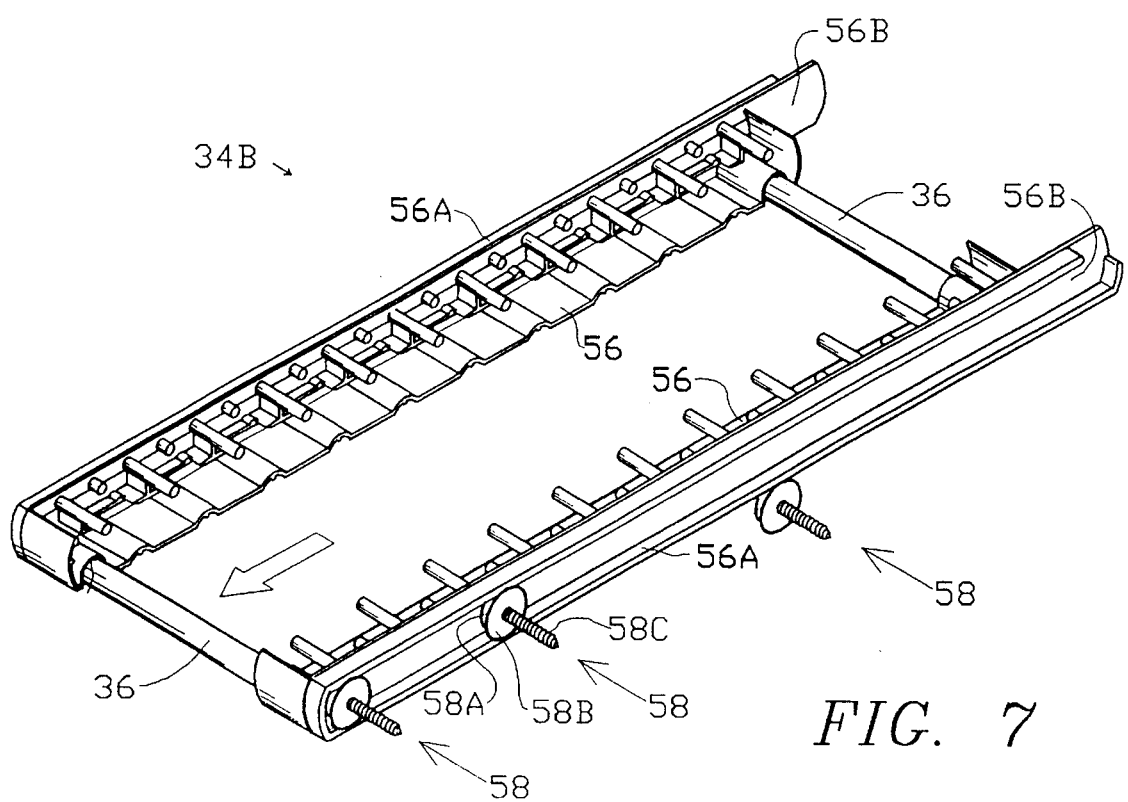
FIG. 7 is an isometric view of a single column storage frame of the present invention assembled from a pair of tubular spacers and a pair of side rails molded with integral slide roller tracks.

FIG. 7 is an isometric view of a single column storage frame of the present invention assembled from a pair of tubular spacers 36 (as in FIG. 6) and a pair of side rails 56 that are specially formed in the molding process with integral flange 56A extending outwardly away from the storage column from around the periphery of the sidewall as shown. Flanges 56A cooperate with a group of roller units 58 that are secured to adjacent associated cabinetry so as to form a slide roller track. Typically three roller units 58 are utilized on each side of the frame 34B, and are located in the pattern as shown, the frame 34B being shown located at the in-cabinet end of its slide travel. Each roller unit 58 includes a rotating roller 58A, a fixed guide washer 58B and a mounting screw 58C which serves as a fixed bearing shaft for roller 58A, and which secures the roller unit 58 to adjacent associated cabinetry. An extension portion 56B is formed at one end of each side rail 56: in each extension portion 56B an opening is provided in the flange 56A, as shown, to facilitate removal and replacement of the frame 34B from the roller units 58 installed in the cabinetry.

Figure 8:
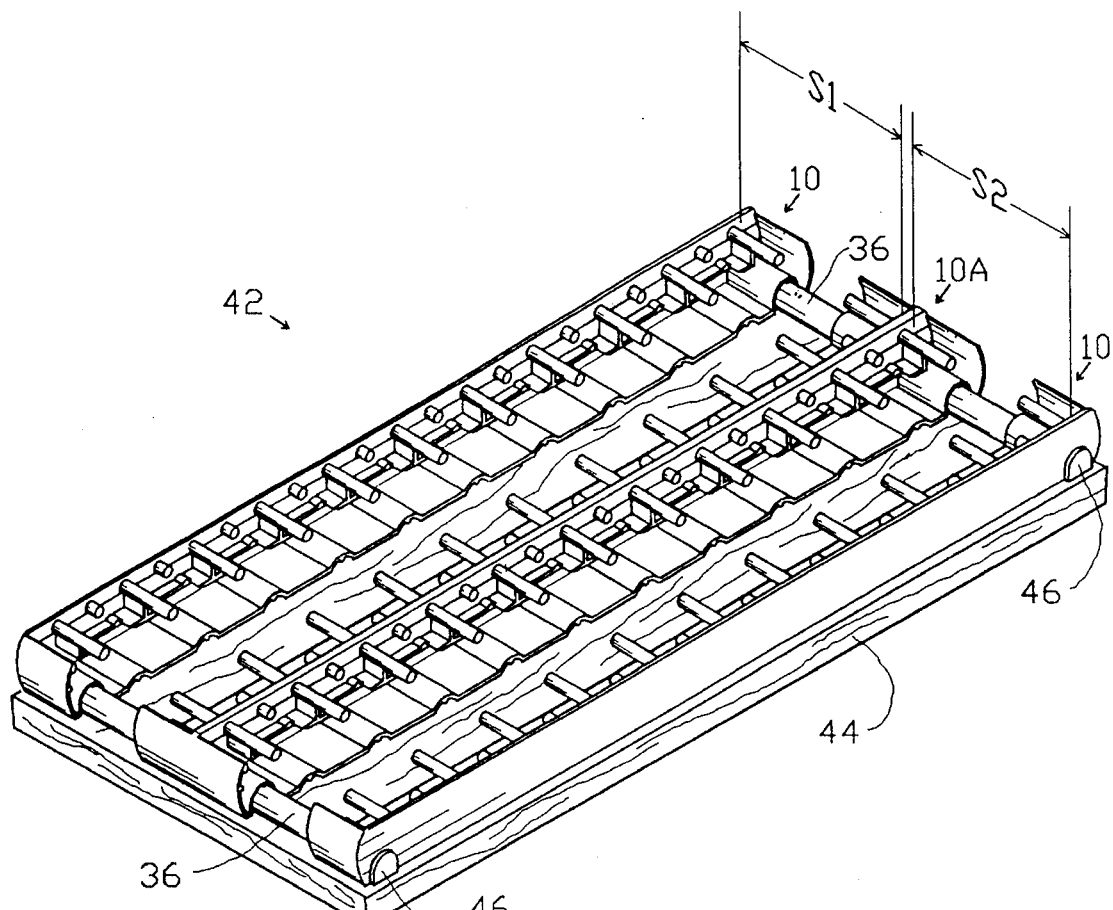
FIG. 8 is an isometric view of two-column storage frame of the present invention assembled from a pair of side rails and a central rail snapped onto a pair of tubular spacers mounted on a baseplate.

FIG. 8 shows an two column storage unit 42 assembled from components of the present invention. A frame is formed initially from pair of tubes 36 and a pair of side rails; the frame could be configured as in FIG. 4, 5, 6 or 7, however in this example the tubes 36 are secured onto a mounting plate 44, which may be a slidable or fixed wooden cabinet shelf. Tubes 36 are fitted to end caps 46 that are screwed down onto mounting plate 44 thus retaining tubes 36 in place. Snapped into place on tubes 36, in addition to the side rails 10 is a central partition rail 10A that is molded in a single part to provide in effect the support patterns of two side rails 10 back-to-back. Partition rail 10A is molded as a single part having a central wall that is typically 0.26" thick at the top. The downward-facing tunnels at each end traverse the entire partition rail 10A so that it can be snapped in place onto tubes 36 of a frame, where it is frictionally retained and can be readily adjusted to provide required wall spacings S1 and S2, and can removed in a twisting action in the same manner as the side rails 10.

The end caps 46 are flanged to act as end stops to constrain the side rails 10 at the end of tubes 36. The side rails 10 are typically but not necessarily located fully at the limit of their travel range toward the ends of tubes 36.

The introduction of a central partition rail 10A forms two side-by-side storage columns as shown. The tubes 36 may be made any desired length and any number of additional storage columns of any desired equal or unequal spacings S1 and S2 can be provided by inserting one or more additional partition rails 10A at selected locations.

In an alternate frame mounting arrangement where a baseplate 44 is utilized and only non-adjustable fixed spacings S1 and S2 are required in respective columns, the spacer tubes 36 could be eliminated, being replaced by short cylinders, designed to each engage a corresponding tunnel 24, each screwed down onto the base plate 44 at the tunnel regions to provide the desired rail locations. For such configurations where a baseplate 44 is utilized, e.g. as shown in FIGS. 4 and 8, the base flange 20 on side rail 10 could be eliminated and the side rail fastened to baseplate 44 by alternative means, since the baseplate 44 can provide bottom support of packages in lieu of the base flange 20.

This invention makes possible the support of other combinations of two or three different sized media packages in the same storage column by selecting the spacing, as well as support of a single media per column; and adjacent storage columns can be made to support like or unlike media packages, in portrait or landscape orientation.

The provision of major and minor support ribs, 20A and 18C respectively in FIG. 1A, represents a refinement of the invention by providing a sliding bottom support interface that ensures smooth "flipping" of packages between their two stable inclined upright supported positions: the support ribs are not essential to the invention, which could be practiced in an alternative embodiment with the support ribs of either or both types eliminated.

Similarly, configuring the shelf 18A (FIG. 1A) to have a notch such as notch 18E in each support cluster as shown and described is an improvement that provides three different sizes of package support cells: the invention could be practiced with these notches eliminated in an alternative embodiment that would provide only two different sizes of package support cells. A further simplified form of the invention is possible in an alternative embodiment wherein the shelf 18A is eliminated, thus providing two different sizes of package support cells with only a single bottom support level.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A package support construction, comprising:

a pair of spaced apart parallel side rail members for helping to support thereinbetween thin package members each having a wide transverse dimension, and thick package members each having a narrow transverse dimension;

means for securing said side rail members in a substantially parallel relation relative to one another to form a support frame for the package members;

a pair of spaced apart thin package member support shelves extending from corresponding ones of said side rail members toward one another for supporting from below said thin package members only, said side rail members being dimensioned to permit the thick package members to fit therebetween;

a series of spaced apart long stop members disposed generally in a common plane on said side rail members and extending in a pair of spaced apart rows transversely from corresponding ones of said side rail members in a confronting relationship for helping to define thick package receiving slots between opposed pairs of long stop members for helping to support said thick package members therebetween in either a backwardly or forwardly inclined upright manner between said shelves, said rows of long stop members being disposed above said shelves;

a series of spaced apart short stop members disposed generally in said common plane interleaved alternatingly with said long stop members on said side rail members and extending transversely in a pair of spaced apart rows from corresponding ones of said side rail members in a confronting relationship above said shelves and cooperating with said long stop members to define thin package receiving slots between opposed pairs of said short stop members for helping to support said thin package members therebetween either in a backwardly or forwardly inclined upright manner supported from below on said shelves at inclinations generally parallel to the thick package members, said pairs of long stop members and said pairs of short stop members having substantially different horizontal lengths relative to each other to permit the thin package members to fit between oppositely disposed pairs of said short stop members; and said pairs of long stop members and said short stop members being interleaved in said common plane and spaced apart from one another by a sufficient distance to permit the thin package members and the thick package members to be shifted in unison between forwardly inclined parallel positions and backwardly inclined parallel positions to maintain the forwardly inclined package members and the backwardly inclined package members in generally parallel dispositions.

2. A package support construction according to claim 1, further comprising:

a pair of spaced apart lower support members disposed spaced apart from said pair of shelves and extending perpendicularly from corresponding ones of said side rail members for supporting from below said thick package members only.

3. A package support construction according to claim 2, wherein the individual lower support members in said thick package slot each include a centrally disposed rounded protuberance for helping said thick package members to be shifted forwardly and backwardly within said thick package slots.

4. A package support construction according to claim 1, wherein the shelves in said thin package slot each include at least another centrally disposed rounded protuberance for helping said thin package members to be shifted forwardly and backwardly within said thin package slots.

5. A package support construction according to claim 1, wherein the pair of shelves include pairs of spaced apart rectangularly shaped cut outs centrally disposed within said thick package slots for helping to define a medium package slots to facilitate supporting therein in an inclined upright manner a medium package members having a shorter longitudinal dimension and an intermediate transverse dimension.

6. A package support construction according to claim 5, further including lower support means having a pair of crossbar support members connected to said side rail members for holding them in said substantially parallel relation relative to one another; and a pair of spaced apart lower support members disposed spaced apart from said pair of upper support members and extending perpendicularly from corresponding ones of said rail members for supporting from below said thick package members and said medium package members only.

7. A package support construction according to claim 6, wherein the lower support members in said thick package slot each include a centrally disposed rounded protuberance for helping said thick package member and said medium package member to be shifted forwardly and backwardly within their respective slots.

8. A package support construction according to claim 1, wherein at least one of said pair of spaced apart side rail members includes an outwardly extending support rail for helping to support the construction.

9. A package support construction according to claim 1, wherein said long stop members are arranged in sets of spaced apart opposing pairs extending perpendicularly from corresponding ones of the side rail members; and said thick package slots being sufficiently dimensioned to receive therein the thick package members at a desired angle of inclination relative to its long longitudinal dimension.

10. A package support construction according to claim 1, wherein said thick package slots facilitate the shifting of thick package members therein between forwardly inclined positions and rearwardly inclined positions to petit the removal of the thick package member from said thick package slots.

11. A package support construction according to claim 1, wherein said long stop members and said short stop members are interleaved in the same rows generally within said common plane on said respective pair of side rail members.

12. A package support construction according to claim 11, wherein each short stop members cooperate with corresponding long stop members for helping to define a pair of thin package slots, said stop members having substantially equal dimensions.

13. A package support construction according to claim 9, wherein said thin package slots are sufficiently dimensioned to receive therein the thin package members at said desired angle of inclination relative to its short longitudinal dimension.

14. A package support construction according to claim 1, wherein the thick package members and the thin package members are stored in adjacent thick package and thin package slots for permitting the packages to be flipped in unison either forwardly or backwardly within their respective slots and for removal from thin respective slots selected package members.

15. A package-supporting structure having an array of support cells for organized columnar storage and display of relatively thin orthogonal packages including packages of different sizes intermixed, each package being held in an inclined upright position by constraint provided by one of the support cells at a lower corner of the package, comprising:

basic support means defining a generally horizontal upwardly-facing basic support surface for supporting packages of at least one of the different sizes along at least a portion of a bottom edge of each thusly supported package;

an elongated side rail having a generally flat vertical wall extending upwardly from the basic support surface and forming a first side boundary of a storage column, the wall having a generally flat inwardly-facing surface shaped so as to articulate an integral package-support pattern defining a horizontal row of alternately long and short posts having lengths L1 and L2 respectively and extending inwardly from the wall and spaced apart uniformly by a separation dimension T1 between adjacent posts and a separation dimension T2 between long posts, thus defining in each region between adjacent long posts a dual-purpose support cluster that provides a package support choice between (1) a pair of first-sized package-support cells each having the thickness support spacing dimension T1 defined between adjacent posts, and (2) the single second-sized package-support cell having a thickness support spacing dimension T2 defined between adjacent long posts and having a bottom support surface defined by the basic support surface;

a longitudinal horizontal shelf integrally attached to the inwardly facing surface of the wall of said side rail in a region thereof between the row of posts and the basic support surface, extending inwardly to an inward shelf edge defining a shelf width W1 less than the long post length L1 but no less than the short post length L2, said shelf providing package bottom support, for packages that receive lateral constraint from the wall, at a second support level above that of the basic support surface, the basic support surface being made to extend inwardly beyond the inward shelf edge so as to provide bottom support for packages that receive lateral constraint from the inward shelf edge;

wherein said shelf is configured with a series of substantially rectangular notches, each notch being centered within a corresponding support cluster and having a length T3 defining a third support cell thickness dimension, said shelf being made to have a full shelf width W1 at those portions of said shelf between the notches, and a reduced shelf width W2 at those portions of said shelf extending along the length T3 of each notch;

whereby each cluster is further enabled to support a package having a third thickness, resting on the basic support surface and supported between ends of the notch defining a third support cell providing a thickness constraint dimension T3 and lateral constraint provided by an edge of the notch at a distance inward from the wall equal to the reduced width W2, thus forming between each pair of adjacent ones of said long posts a support cluster providing support for an intermixture of packages of three different base sizes.

16. The package-supporting structure as defined in claim 15, wherein said basic support means comprises an elongate generally flat horizontal base flange formed integrally with the vertical wall of said side rail and extending inwardly to an inward edge defining a flange width.

17. The package-supporting structure as defined in claim 15, wherein said basic support means comprises a flat rectangular horizontal baseplate to which said siderail is secured.

18. The package-supporting structure as defined in claim 15, further comprising:

a flat, unarticulated vertical support surface, for laterally constraining supported packages, disposed at a second side boundary of the storage column opposite and parallel to the first side boundary thereof; and spacing means for securing said side rail and said vertical support surface in a manner to separate said vertical wall of said side rail from said vertical support surface by a predetermined spacing dimension S;

whereby, for a particular value of S, a choice of package-support cells of two different sizes is provided within each cluster: (1) two first-sized cells each dimensioned T1 by S and (2) a single second-sized cell dimensioned T2 by S–L2, thus enabling storage and display of intermixed packages of two different cross-sectional base sizes, constrained laterally and supported at a lower corner thereof.

19. The package-supporting structure as defined in claim 15, further comprising:

a second like side rail, disposed in mirror image relation to said side rail so as to define a second boundary of the storage column opposite the first side boundary thereof; and rail spacing means secured to said two side rails in a manner to separate the inwardly-facing wall surfaces of said side rails by a predetermined side rail spacing dimension S;

whereby a choice between two package-support cell sizes is provided within each pair of opposed clusters: (1) two first cells dimensioned T1 by S and (2) a second cell dimensioned T2 by S–2*L2, thus enabling said package support structure to store and display an intermixture of packages of two different cross-sectional base sizes supported and constrained laterally at two lower corners thereof.

20. The package-supporting structure as defined in claim 19, wherein the posts are made cylindrical in shape and wherein said structure is further defined to be configured such that, nominally, the spacing T1 between short and long posts is made to be 0.456", the spacing T2 between long posts is made to be 1.16" the short post length L2 is made to be 0.3825" and the rail spacing dimension S is made to be 4.9";

whereby each pair of opposed clusters provides intermixed two-corner package support for a selection between two different-sized packages:

(1) two CD (compact disc) packages, each having a nominal base size 0.412" by 4.9" and each supported in a cell sized 0.456" by 4.9", and (2) one VHS (video cassette) package having a nominal base size 1.02" by 4.135" supported in a cell sized 1.16" by 4.135".

21. The package-supporting structure as defined in claim 15, wherein the posts are cylindrical in shape.

22. The package-supporting structure as defined in claim 15, further comprising a plurality of substantially rectangular vertical strengthening webs each extending downwardly from a corresponding one of said long posts to said shelf, each web being integrally attached to the corresponding post, the wall and the shelf.

23. The package-supporting structure as defined in claim 15, further comprising, within each support cluster, a pair of minor support ribs made integral with said shelf and protruding upwardly therefrom to each form a portion of a cylindrical surface having a transverse axis, disposed symmetrically within the cluster each centered horizontally within a corresponding space between a short post and a long post, and each extending inwardly from the wall transversely across said shelf, said ribs providing a sliding bottom support interface that facilitates shifting a thusly supported package between two stable inclined storage positions provided by the corresponding support cell.

24. A package-supporting structure having an array of support cells for organized columnar storage and display of relatively thin orthogonal packages including packages of different sizes intermixed, each package being held in an inclined upright position by constraint provided by one of the support cells at a lower corner of the package, comprising:

an elongated side rail configured generally as an L-shaped angle bracket having a generally flat vertical wall formed integrally with a generally flat horizontal base flange extending to an inward edge thereof, the wall of said side rail forming a first side boundary of a storage column and having a generally flat inwardly-facing surface shaped so as to articulate an integral package-support pattern;

a horizontal row of alternately long and short cylindrical posts formed integrally on the inwardly-facing surface of the wall and extending inwardly therefrom, the long and short posts constituting a portion of the package-support pattern, having diameters D1 and D2 and lengths L1 and L2 respectively, spaced apart uniformly by a separation dimension T1 between adjacent posts and a separation dimension T2 between long posts;

a longitudinal horizontal shelf integrally attached to the inwardly facing surface of the wall of said side rail in a region thereof between the row of posts and the base flange, extending inwardly to an inward shelf edge defining a shelf width W1 less than the long post length L1 but no less than the short post length L2, said shelf providing bottom support for thusly supported packages at an upper support level above that of the base flange, the base flange being made to extend inwardly beyond the inward shelf edge so as to provide bottom package support at the basic support surface;

said shelf being configured to define a series of substantially rectangular notches, each notch being centered within a corresponding support cluster and having a length T3 defining a third support cell thickness dimension;

said shelf being further configured to have a full shelf width W1 at those portions of the shelf between the notches, and a reduced shelf width W2 at those portions of the shelf extending along the length T3 of each notch;

said structure, within a region between adjacent long posts, provides a triple-purpose support cluster that provides a package support selection from three different sized support cells as follows:

(1) two first-sized cells having a thickness dimension T1 defined between posts, providing lateral constraint from the wall and providing bottom support from the shelf, (2) a second-sized cell having a thickness dimension T2 defined between long posts, providing lateral constraint from the shelf edge and providing bottom support from the base flange, and (3) a third-sized cell having a thickness dimension T3 defined by the corresponding slot which also provides lateral constraint and provides bottom support from the base flange.

25. The package-supporting structure as defined in claim 24 further comprising, within each support cluster, a pair of minor support ribs made integral with the shelf and protruding upwardly therefrom to each form a portion of a cylindrical surface having a transverse axis, disposed symmetrically within the support cluster, each centered horizontally within a corresponding space between a short post and a long post, and each extending inwardly from the wall transversely across the shelf, said minor support ribs providing a sliding bottom support interface that facilitates shifting a thusly supported package between two stable nearly upright storage positions provided by the corresponding support cell.

26. The package-supporting structure as defined in claim 24 further comprising a plurality of major support ribs made integral with the base flange, each of said ribs being centered within a corresponding support cluster and forming an upwardly-protruding portion of a transverse cylindrical surface extending from the wall across the base flange to the edge thereof so as to provide a sliding bottom support interface that facilitates shifting thusly supported packages between two stable upright partially inclined positions provided by the corresponding support cell.

27. The package-supporting structure as defined in claim 26 further comprising, within each support cluster, a pair of minor support ribs made integral with the shelf and protruding upwardly therefrom to each form a portion of a cylindrical surface having a transverse axis, disposed symmetrically within the support cluster, each centered horizontally within a corresponding space between short posts and long posts, and each extending inwardly from the wall transversely across the shelf, said minor support ribs providing a sliding bottom support interface that facilitates shifting and thusly supported package between two stable nearly upright storage positions provided by the corresponding support cell.

28. The package-supporting structure as defined in claim 24 wherein the structure is further defined to be configured such that:

the spacing T1 between short and long posts is made to be 0.456";

the spacing T2 between long posts is made to be 1.16";

the diameter D2 of the short posts is made to be 0.192"; and the length T2 of the notches is made to be 0.756";

whereby each cluster provides one-corner package support for a selection from three different-sized packages as follows:

two CD (compact disc) packages, each having a nominal thickness of 0.412" each resting on a minor support rib and each supported within a cell thickness of 0.456" defined by the spacing T1 between said posts;

an audiotape cassette package having a nominal thickness of 0.67", resting on a major arched support guide and supported between ends of a notch having a length T2, i.e. 0.756"; and a VHS (videotape cassette) package having a nominal thickness of 1.02", resting on a major arched support guide and supported within a cell thickness of 1.16" defined by the spacing T2 between adjacent ones of said long posts.

29. The package-supporting structure as defined in claim 24 further comprising:

a vertical support surface disposed parallel to the side rail wall opposite the first side boundary;

a horizontal support surface disposed adjacent to said vertical support surface at a level generally corresponding to the shelf portion of said side rail; and spacing means for securing said side rail and said vertical support surface in a manner to separate said vertical surface of said side rail from said vertical support surface by a predetermined spacing dimension S;

whereby, for a particular value of S, a choice of package-support cells of three different sizes is provided within each cluster: two cells dimensioned 0.456" by S, a cell dimensioned 0.756" by S-W2, and a cell dimensioned 1.16" by S-W1, thus enabling said package support structure to store and display packages of up to three different cross-sectional base sizes intermixed.

30. The package-supporting structure as defined in claim 29 wherein spacing dimension S is selected from the following group so as to provide support for a column of packages of corresponding package size and orientation:

dimension S is made about 4.9" to provide between adjacent posts a cell size 0.456" by about 4.9" for supporting CD packages in portrait orientation having a nominal base size 0.412" by 4.9";

dimension S is made about 5.59" to provide between adjacent posts a cell size 0.456" by about 5.59" for supporting CD packages in landscape orientation having a nominal base size 0.412" by 5.59";

dimension S is made about 2.742"–W2 to provide within the notches a cell size 0.756" by about 2.72" for supporting audiotape cassette packages in portrait orientation having nominal base size 0.67" by 2.72";

dimension S is made about 4.29"+W2 to provide within the notches a cell size 0.756" by about 4.29" for supporting audiotape cassette packages in landscape orientation having a nominal base size 0.67" by 4.29";

dimension S is made about 4.135"+W1 to provide between adjacent ones of said long posts a package-support cell sized 1.16" by about 4.135"+for supporting VHS packages in portrait orientation having a nominal base size 1.02" by 4.135"; and dimension S is made about 7.525"–W1 to provide between adjacent ones of said long posts a cell size 1.16" by about 7.525" for supporting VHS packages in landscape orientation having a nominal base size 1.02" by 7.525".

31. The package-supporting structure as defined in claim 29 wherein shelf width dimension W1 is made 0.375", W2 is made 0.2" and spacing dimension S is made about 4.135"+W1, i.e. about 4.51", whereby a choice between package-support cells of at least two different sizes is provided within each cluster: a first cell size, 1.16" by about S–W1, i.e. 1.16" by about 4.135" for supporting a VHS package having a nominal base size 1.02" by 4.135", and a second cell size 0.756" by about S–W2, i.e. about 4.31" for supporting an audiotape package having a nominal base size 0.67" by 4.29".

32. The package-supporting structure as defined in claim 24 further comprising:

a second like side rail, disposed in mirror image relation to said side rail so as to define a second boundary of the storage column opposite the first side boundary thereof; and rail spacing means secured to said two side rails in a manner to separate the inwardly-facing wall sides of said side rails by a predetermined side rail spacing dimension S;

whereby a choice between three different package-support cell sizes is provided within each cluster: two first cells sized T1 by S where T1=C–(D1+D2)/2, a second cell sized T3 by S–2*W2, and a third cell sized T2 by S–2*W1, thus enabling said package support structure to store and display packages of up to three different cross-sectional base sizes intermixed, with each package supported and constrained laterally at two lower corners thereof.

33. The package-supporting structure as defined in claim 32, supporting CD (compact disc) packages and VHS (videotape cassette) packages, in portrait orientation, said structure further defined to be configured with the following nominal dimensions:

the length L1 of the short posts is made to be 0.2";

the length L2 of the long posts is made to be 0.75";

the full shelf width W1 is made to be 0.375";

the reduced shelf width W2 is made to be 0.2"; and the side rail spacing S, between vertical surfaces, is made to be about 4.9";

whereby each of said first cells is made to be 0.456" by about 4.9" for supporting CD packages having base dimensions 0.412" by 4.9", and said third cell is made to be 1.16" by about 4.15" for supporting VHS packages having base dimensions 1.02"×4.135".

34. The package-supporting structure as defined in claim 32, wherein the side rail spacing dimension S is selected from the following group so as to provide support for a column of packages of corresponding package size and orientation:

dimension S is made about 5.59" to provide between adjacent posts a cell size about 0.456" by 5.59", for supporting CD packages in landscape orientation having a nominal base size 0.412" by 5.59";

dimension S is made about 2.72"+2*W2 to provide within the notches a cell size about 0.756" by about 2.72" for supporting audiotape cassette packages in portrait orientation having a nominal base size 0.67" by 2.72";

dimension S is made about 4.29"+2*W2 to provide within the notches a cell size about 0.756" by about 4.29" for supporting audiotape cassette packages in landscape orientation having a nominal base size 0.67" by 4.29";

dimension S is made about 4.135"+2*W1 to provide between adjacent ones of said long posts a cell size about 1.16" by about 4.135" for supporting VHS packages in portrait orientation having a nominal base size 1.02" by 4.135"; and dimension S is made about 7.525"+2*W1 to provide between adjacent ones of said long posts a cell size about 1.16" by about 7.525" for supporting VHS packages in landscape orientation having a nominal base size 1.02" and 7.525".

35. The package-supporting as defined in claim 32, for supporting more than one column of packages, further comprising:

at least one central rail, disposed in parallel between said side rails and attached to said spacing means, having a first portion configured on one side thereof identical to said side rail in claim 1, further comprising a second portion defining a mirror image of the first portion attached integrally thereto by a common vertical central wall;

whereby multiple storage columns are provided that can support a mixture of different sized packages.

36. The package-supporting structure as defined in claim 32 wherein said rail-spacing means comprise:

a pair of bushings formed integrally in each rail, one at each end of the respective wall, each defining a lateral generally cylindrical cavity region traversing the bushing and the sleeve; and a pair of like cylindrical spacer members each frictionally engaging said rails via the cavity regions at ends of said spacer members, so as to configure said package-supporting structure as a rigid frame.

37. The package-supporting structure as defined in claim 36 wherein said bushings are each configured as a tunnel with the cavity region extending substantially full width of said rail and having an inverted U shape with a generally rectangular opening facing downwardly, whereby said cylindrical spacer members can be forced into place into the cavity region and retained there frictionally.

38. The package-supporting structure as defined in claim 37 further comprising in each bushing, in the cavity region thereof, three bearing ridges formed as inwardly facing protrusion on an inner cylindrical wall of the bushing extending transversely substantially full length of said bushing, disposed radially at approximately 120 degree intervals around the inner cylindrical wall at four, eight and twelve o'clock positions, said bearing ridges serving as bearing surfaces against said spacer member and enabling a snap action assembly and removal of the spacer member in response to a twisting torque applied to said rail.

39. The package-supporting structure as defined in claim 36 wherein said cylindrical spacer members are configured as aluminum tubes having a central bore.

40. The package-supporting structure as defined in claim 39 further comprising end constraint means attached to end regions of said cylindrical spacer members, whereby said side rails are constrained against shifting beyond the end regions.

41. The package-supporting structure as defined in claim 36, intended for mounting to host furniture via a roller slide mechanism, further comprising:

a pair of roller slide channels, constituting a portion of the roller slide mechanism, fastened at ends thereof to respective ends of said pair of cylindrical spacer members so as to form a generally rectangular rigid frame carrying said rails frictionally engaged on said spacer members.

42. The package-supporting structure as defined in claim 36 intended for mounting to host furniture via a roller slide mechanism, further comprising:

a pair of roller slide channels, each formed integrally on an outwardly-facing wall of a corresponding one of said side rails engaged on said cylindrical spacer members, configured to each constitute a functional element of the roller slide mechanism.

43. The package-supporting structure as defined in claim 42 further comprising:

a plurality of rollers attached to the host furniture, cooperating with said pair of channels in a manner to enable the rigid frame, along with said rails and packages supported thereby, to be slidably moved relative to the host furniture.

* * * * *

UNITED STATES PATENT AND TRADEMARK OFFICE
CERTIFICATE OF CORRECTION

PATENT NO : 5,558,235
DATED : September 24, 1996
INVENTOR(S): Thomas A. Hunt

It is certified that error appears in the above-identified patent and that said Letters Patent is hereby corrected as shown below:

Column 8, line 50, before "lower", delete "individual".

Column 8, line 63, after "define", delete "a".

Column 8, line 65, after "manner", delete "a".

Column 9, line 4, after "in", delete "said".

Column 9, line 32, after "positions to", delete "petit", and substitute therefor --permit--.

Column 11, line 33, after "1.16" ", insert --,--.

Column 11, line 44, after "4,135" ", insert --,--.

Column 14, line 28, after "about", delete "4.135"+for", and substitute therefor --4.135"+ for--.

Column 14, line 45, delete "audiotape", and substitute therefor --audio tape--.

Signed and Sealed this

Seventeenth Day of June, 1997

Attest:

Attesting Officer

BRUCE LEHMAN

Commissioner of Patents and Trademarks